(12) United States Patent
Huang et al.

(10) Patent No.: US 9,984,838 B2
(45) Date of Patent: May 29, 2018

(54) CLICK PAD

(71) Applicant: HEWLETT-PACKARD DEVELOPMENT COMPANY, L.P., Houston, TX (US)

(72) Inventors: Chin-Hung Huang, Taipei (TW); Ming-Jen Yu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/309,829

(22) PCT Filed: Aug. 29, 2014

(86) PCT No.: PCT/US2014/053420
§ 371 (c)(1),
(2) Date: Nov. 9, 2016

(87) PCT Pub. No.: WO2016/032514
PCT Pub. Date: Mar. 3, 2016

(65) Prior Publication Data
US 2017/0271101 A1    Sep. 21, 2017

(51) Int. Cl.
*G06F 1/16* (2006.01)
*H01H 13/14* (2006.01)

(52) U.S. Cl.
CPC ............ *H01H 13/14* (2013.01); *G06F 1/169* (2013.01); *H01H 2215/004* (2013.01)

(58) Field of Classification Search
CPC combination set(s) only.
See application file for complete search history.

(56) References Cited

U.S. PATENT DOCUMENTS

| | | | |
|---|---|---|---|
| 6,219,038 B1 * | 4/2001 | Cho ...................... | G06F 1/1616 200/305 |
| 6,429,846 B2 | 8/2002 | Rosenberg et al. | |
| 7,119,291 B2 * | 10/2006 | Sun ....................... | G06F 1/1616 200/5 A |
| 7,450,110 B2 | 11/2008 | Shahoian et al. | |
| 7,729,519 B2 * | 6/2010 | Shigenobu ............ | G06F 1/1616 382/116 |
| 7,767,923 B2 * | 8/2010 | Lin ....................... | G06F 1/1616 200/345 |
| 8,139,347 B2 | 3/2012 | Chiang et al. | |
| 8,174,846 B2 * | 5/2012 | Hamada .............. | G06F 3/03547 361/728 |
| 8,441,450 B2 * | 5/2013 | Degner ............... | G06F 3/03547 178/18.01 |
| 8,456,437 B2 | 6/2013 | Chiang et al. | |

(Continued)

FOREIGN PATENT DOCUMENTS

TW          201207678 A    2/2012

*Primary Examiner* — Lisa Lea Edmonds
(74) *Attorney, Agent, or Firm* — HPI Patent Department (57) ABSTRACT

Examples disclosed herein relate to a click pad. Examples include a circuit board and a switch formed to extend from the circuit board. A stationary pad surrounds all surfaces of the switch extending from the circuit board, is coupled to the switch opposite to the circuit board, and is to be compressed by actuation of the circuit board when a pressure is put on the click pad. A bracket is coupled to the pad to compresses the pad between the circuit board and the bracket.

15 Claims, 5 Drawing Sheets

(56) References Cited

U.S. PATENT DOCUMENTS

| | | | |
|---|---|---|---|
| 8,552,991 B2* | 10/2013 | Yoon | G06F 1/1616 345/173 |
| 8,803,852 B2* | 8/2014 | Tsai | G06F 3/03547 345/173 |
| 9,025,322 B2* | 5/2015 | Chang | G06F 1/1662 345/168 |
| 9,030,839 B2* | 5/2015 | Leggett | G06F 1/182 345/173 |
| 9,201,462 B2* | 12/2015 | Tsai | G06F 1/1662 |
| 9,229,538 B2* | 1/2016 | Kao | G06F 3/03 |
| 9,372,510 B2* | 6/2016 | Tanaka | G06F 1/169 |
| 2003/0025679 A1 | 2/2003 | Taylor et al. | |
| 2004/0061686 A1* | 4/2004 | Tsao | G06F 1/1616 345/173 |
| 2004/0200701 A1* | 10/2004 | Nakatani | G06F 1/1616 200/181 |
| 2006/0022957 A1* | 2/2006 | Lee | G06F 3/03547 345/173 |
| 2006/0164400 A1 | 7/2006 | Sun et al. | |
| 2007/0040246 A1 | 2/2007 | Chen et al. | |
| 2007/0236473 A1* | 10/2007 | Hong | G06F 1/1616 345/173 |
| 2009/0040187 A1 | 2/2009 | Ko et al. | |
| 2009/0147470 A1* | 6/2009 | Nakatani | G06F 1/1616 361/679.55 |
| 2011/0079498 A1* | 4/2011 | Lin | G06F 3/03547 200/341 |
| 2011/0249383 A1* | 10/2011 | Horii | G06F 1/169 361/679.01 |
| 2011/0254786 A1* | 10/2011 | Wen | G06F 1/1616 345/173 |
| 2012/0039038 A1* | 2/2012 | Song | G06F 1/1616 361/679.55 |
| 2012/0182236 A1 | 7/2012 | Tsai et al. | |
| 2012/0306785 A1* | 12/2012 | Chien | G06F 1/169 345/173 |
| 2013/0234938 A1* | 9/2013 | Xue | G06F 3/03547 345/158 |
| 2013/0286625 A1* | 10/2013 | Huang | H05K 5/0086 361/809 |
| 2014/0016291 A1* | 1/2014 | Horii | G06F 1/169 361/807 |
| 2014/0116865 A1* | 5/2014 | Leong | G06F 3/0202 200/344 |
| 2014/0133112 A1 | 5/2014 | Kao et al. | |
| 2014/0293157 A1* | 10/2014 | Hoshi | G06F 1/169 349/12 |
| 2014/0313648 A1* | 10/2014 | Yang | G06F 1/169 361/679.01 |
| 2015/0160750 A1* | 6/2015 | Wu | G06F 3/016 345/173 |

* cited by examiner

```
┌─────────────────────────────────────┐
│ RECEIVING DEFORMATION FORCE FROM    │
│ BRACKET IN STATIONARY PAD DISPOSED  │─ 602
│ ON FIRST SURFACE OF SWITCH          │
│ EXTENDING FROM PRINTED CIRCUIT      │
│ BOARD, WHEREIN THE STATIONARY PAD   │
│ SURROUNDS UPPER AND SIDE SURFACES   │
│ OF SWITCH                           │
└─────────────────────────────────────┘
                  │
                  ▼
┌─────────────────────────────────────┐── 604
│ COMPRESSING UPPER PROTRUSION        │
│ FROM FIRST SURFACE OF PAD COUPLED   │
│ TO BRACKET IN RESPONSE TO RECEIVING │
│ DEFORMATION FORCE                   │
└─────────────────────────────────────┘
```

FIG. 6

CLICK PAD

BACKGROUND

Touch sensitive devices may be used in computing devices as input devices to replace the use of a separate mouse. Touch sensitive devices may detect user gestures, such as sliding a finger across a surface, and translate them into operations, such as cursor movement, through various methods. For example, capacitance and conductance sensing may be used to determine whether a user is touching the surface of the touch sensitive device and in what location. Touch sensitive devices may provide a physical or virtual button to a user to mimic a button on a mouse.

BRIEF DESCRIPTION OF THE DRAWINGS

The following detailed description references the drawings, wherein.

DETAILED DESCRIPTION

In the following discussion and in the claims, the terms "including" and "comprising" are used in an open-ended fashion, and thus should be interpreted to mean "including, but not limited to . . . " Also, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. The term "approximately" as used herein to modify a value is intended to be determined based on the understanding of one of ordinary skill in the art, and can, for example, mean plus or minus 10% of that value.

The following discussion is directed to various examples of the disclosure. Although one or more of these examples may be preferred, the examples disclosed should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example.

As used herein, a "click pad" is a type of a touch sensitive device which may provide a virtual button to perform certain gestures, such as a left- or right-mouse click. In some examples, a click pad may contain internal switches beneath the touchpad surface for performing button click functions, while providing the user a similar feel to pressing a physical button. Button selection may be emulated through internal switches located below the click pad surface that detect when a user has pressed down on the click pad surface. One type of click pad uses a hinge-type internal button that pivots when pressed by a user in certain areas of the touch pad surface to emulate physical button clicks. In another type click pad, pressing down anywhere on the click pad surface lowers the entire plane of the touchpad surface, activating an internal switch. The distance a click pad surface travels to actuate the internal switch may be referred to as a "travel distance." A "computing device" or "device" may be a desktop computer, laptop (or notebook) computer, tablet computer, smartphone, or any other processing device or equipment using a click pad.

As used herein, a "deformation force" refers to a force on a component caused by a defect in another component rather than actuation of another component. In an illustration, a force received on a switch as a result of a manufacturing error in a bracket is a deformation force. In contrast, a force received on a switch as a result of actuation of switch by a user is not a deformation force.

Failure of a click pad to move in a direction to actuate the internal switch can occur because of defects in components of the click pad (such as, manufacturing errors) and result in the internal switch being pre-loaded (e.g., actuated or compressed when in an unloaded position). In order to prevent click pad failure, a gap has been allowed between the internal switch and a surface below the switch which actuates the switch when the click pad surface is pressed. However, such a gap may cause a user to experience different travel distances to actuate the switch depending on where on the click pad surface the user presses down. In an example, pressing down on a portion of the click pad surface above the internal switch may have a smaller travel distance than a pressing down on the click pad further away from the internal switch.

To address these issues, in the examples described herein, a flexible pad may be provided between an internal switch of a click pad and a surface of the click pad used to actuate the switch. The pad may absorb or dissipate a force, within a tolerance range, from components in the click pad to actuate the internal switch due to component defects. In this manner, examples described herein may significantly reduce the difference in travel distance in a click pad.

Figure 1:
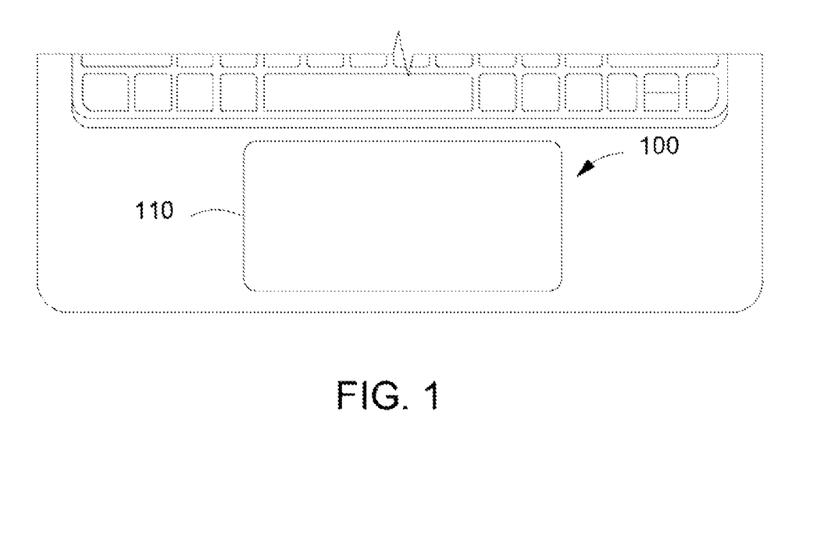
FIG. 1 is a schematic front perspective view of a click pad disposed in housing, according to an example.

Referring now to the drawings, FIG. 1 illustrates a schematic front perspective view of a click pad 100 disposed in a computing device. In the example of FIG. 1, click pad 100 is disposed in a housing of a laptop computer. However, click pad 100 may be disposed in any other computing device or may be a standalone click pad which may be connected to a computing device. Click pad 100 may include a cover 110. Cover 110 may be disposed such that it is exposed in the housing of the laptop computer. Cover 110 may be made composed of any material to provide the ability to detect a gesture on the cover 110. In an example, the cover 110 may be composed of a material to provide capacitance and conductance sensing, such as, a plastic, biaxially-oriented polyethylene terephthalate, glass, etc.

Figure 2:
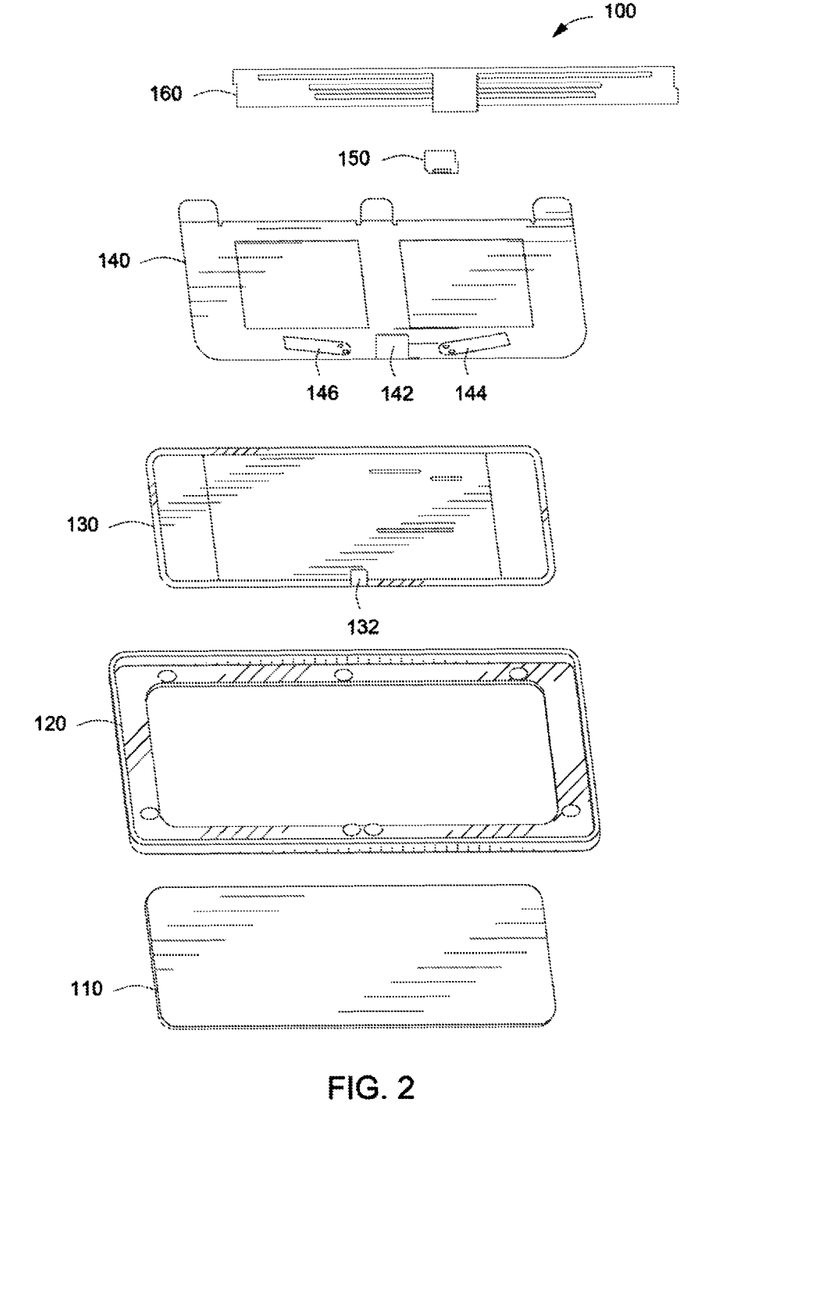
FIG. 2 is a schematic exploded view of the click pad of FIG. 1 according to an example.

FIG. 2 illustrates a schematic exploded view of the click pad 100 of FIG. 1 according to an example. Click pad 100 includes the cover 110, a cover bracket 120 to support cover 110, a circuit board 130 coupled to cover 110 via cover bracket 120, a support frame 140 to support circuit board 130, a pad 150 disposed over a switch 132 extending from circuit board 130, and bracket 160 disposed on pad 150 and secured to cover bracket 120. Cover bracket 120 may include an opening through which cover 110 may be coupled to circuit board 130. In some implementations, cover bracket 120 may be disposed in a housing of a laptop computer to secure the click pad 100 to the housing. For example, cover bracket 120 may be used to secure click pad 100 to the housing of the laptop illustrated in FIG. 1. In an implementation, cover bracket 120 may be secured to the housing such that cover 110 is visible when the click pad 100 is installed in a laptop computer. In such an implementation, cover bracket 120 may secured to the housing such that cover bracket 120 does not move relative to the housing of the laptop computer.

Circuit board 130 may be any circuit board to form electrical circuits thereon. In an implementation, circuit board 130 may be a printed circuit board. Switch 132 extends from a side of circuit board 130 opposite the side of the circuit board coupled to the cover 110. Switch 132 may be any physical switch to be actuated by the movement of the cover 110 relative to the cover bracket 120 and bracket 160 coupled thereto. In an implementation, the switch 132 may be actuated when an upper surface of the switch 132 receives an actuation force from bracket 160. The actuation force from bracket 160 may be generated in response to a force applied to cover 110 to move the cover 110 and components coupled thereto (e.g., circuit board 130 and support frame 140) toward bracket 160. Support frame 140 may be disposed on a surface of circuit board 130 from which switch 132 extends. Support frame 140 includes an opening 142 through which switch 132 may extend. Support frame 140 includes support arms 144 and 146 extending therefrom and disposed along the same edge of support frame 140 as opening 142. Support arms 144 and 146 may be disposed on a surface of support frame 140 to extend in the same direction as switch 132 extends from opening 142.

Bracket 160 is disposed on pad 150 and a portion of cover bracket 120 and support frame 140 including support arms 144 and 146. As illustrated in FIG. 2, bracket 160 may be disposed along a longer edge of cover bracket 120 and is smaller than cover bracket 120 in the dimension perpendicular to the edge along which bracket 160 is disposed. It will be appreciated that in such an implementation, the smaller bracket 160 may reduce a thickness of click pad 100. Bracket 160 may be composed of any sufficiently rigid material to withstand a force applied to cover 110, such as, a metal, a plastic, etc. In some implementation, bracket 160 may be composed of a metal and may be stamped. It will be appreciated that bracket 160 may be deformed in a manufacturing process or a stamping process such that bracket 160 is not approximately planar. Pad 150 is disposed between switch 132 and bracket 160. In an implementation, pad 150 may be directly coupled with switch 132 and disposed to surround switch 132 on circuit board 130. In such an implementation, pad 150 may be coupled to switch 132 by any suitable mechanism, for example, a suction force, an adhesive, etc. It will be understood that pad 150 is stationary with respect to switch 132. In another implementation, pad 150 may be directly coupled to bracket 160.

Figure 3:
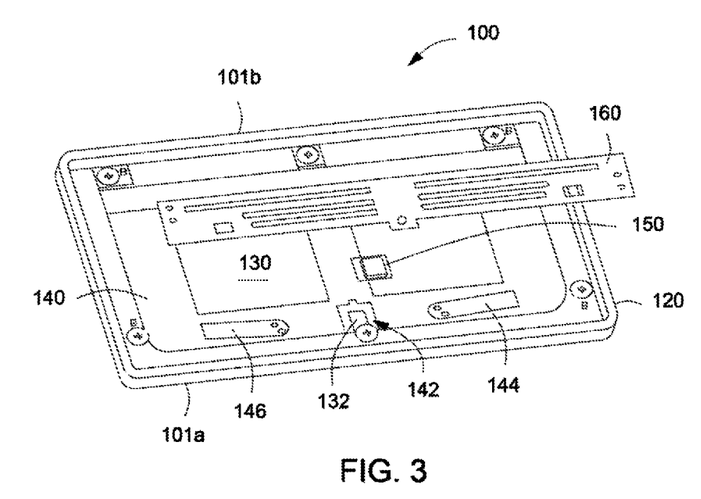
FIG. 3 is a schematic rear partial exploded view of a click pad according to an example.
Figure 4:
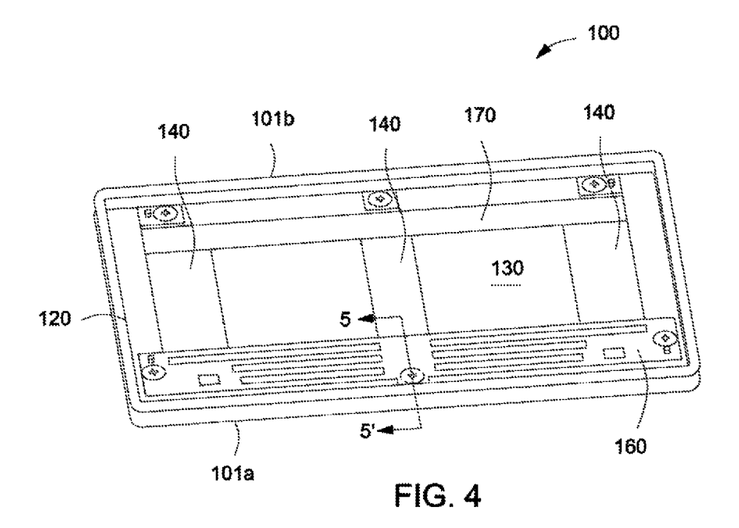
FIG. 4 is a schematic rear perspective view of the click pad of FIG. 3 according to an example.
Figure 5:
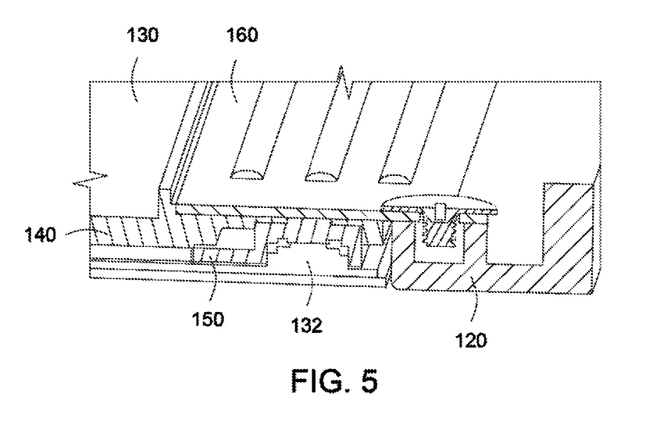
FIG. 5 is a schematic cross-sectional view of the click pad of FIG. 4 taken along 5-5' according to an example.

FIG. 3 illustrates a schematic rear partial exploded view of the click pad 100 of FIG. 1 according to an example. FIG. 4 illustrates a schematic rear perspective view of the click pad 100 of FIG. 3 according to an example. FIG. 5 illustrates a schematic cross-sectional view of the click pad 100 of FIG. 4 taken along 5-5' according to an example. In the implementations of FIGS. 3-5, an optional pivot bracket 170 is shown which may be disposed on support frame 140 and circuit board 130 along an edge 101b of click pad 100. Pivot bracket 170 may pivot to allow a force applied to cover 110 to be understood as a button selection. It is appreciated that in some implementations, pivot bracket 170 may be omitted. For example, pivot bracket 170 has been omitted from the implementation of FIG. 2.

As illustrated in FIGS. 1-5, support frame 140 may include at least one additional opening exposing a portion of circuit board 130 in addition to opening 142. It will be appreciated that such an additional opening may reduce a thickness of the click pad 100. Support frame 140 may structurally support circuit board 130. In an implementation, support frame 140 may be a metal alloy, plastic, etc. and may be coupled to circuit board 130 via an adhesive. Support frame 140 may be coupled to circuit board 130 such that switch 132 extends from opening 142 in a direction opposite to cover 110.

As illustrated in FIGS. 3 and 4, switch 132 may be disposed along an edge 101a of click pad 100. Switch 132 may be further disposed approximately in the center of edge 101a. Supporting arms 144 and 146 may be disposed along edge 101a and extend from support frame 140 in the same direction as switch 132 extends from opening 142. Cover bracket 120 is secured to circuit board 130 and support frame 140. In an implementation, cover bracket 120 may be secured to circuit board 130 and support frame by any suitable mechanism that does not damage circuit board 130, for example, a screw, a bolt, a rivet, an adhesive, welding, etc. As illustrated by FIGS. 3 and 4, pad 150 is disposed over switch 132 and bracket 160 is disposed over pad 150 and supporting arms 144 and 146 when secured to cover bracket 120.

Bracket 160 may be disposed over a portion of support frame 140 and circuit board 130 exposed by support frame 140. Supporting arms 144 and 146 may be coupled to bracket 160. In an implementation, bracket 160 may be secured to cover bracket 120 by screws. In other implementations, bracket 160 may be secured to cover bracket 120 by any suitable manner, including, for example, a bolt, a rivet, an adhesive, welding, etc. As illustrated in FIG. 4, bracket 160 may be disposed along first edge 101a of click pad 100 opposite to a second edge 101b along which pivot bracket 170 may be disposed.

Figure 6:
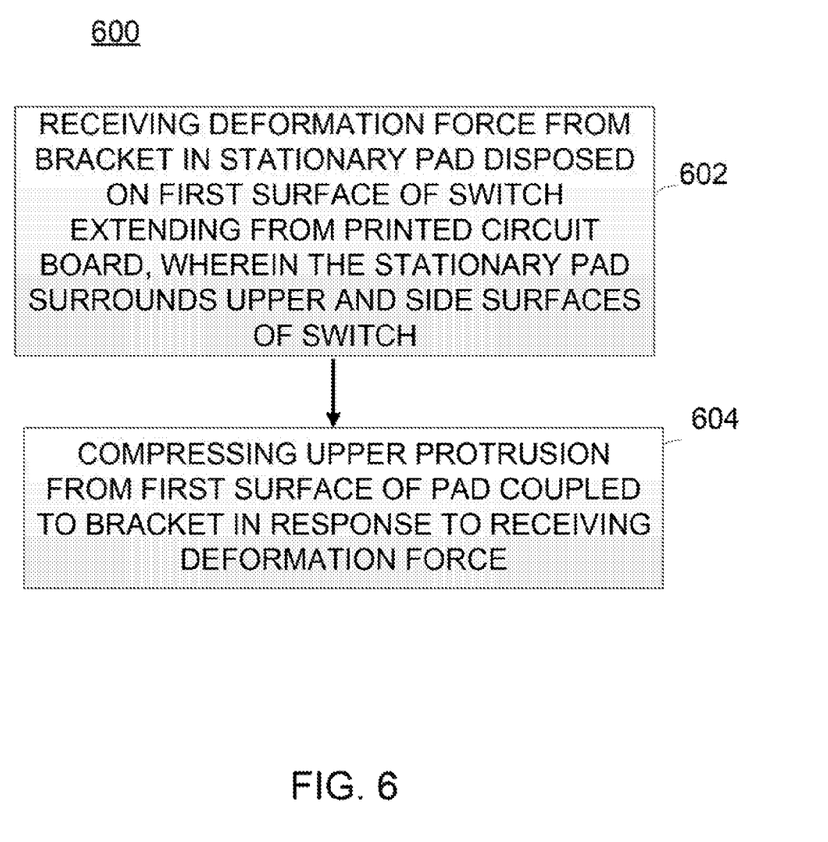
FIG. 6 is a flowchart of a method for dissipating a deformation force from a bracket in a click pad according to an example.

As illustrated in FIG. 6, an upper surface of switch 132 extending from circuit board 130 includes a stepped surface. In an implementation, an upper portion of the stepped surface of switch 132 may be circular, rectangular, square, triangular, etc. As discussed above with reference to FIG. 2, switch 132 may be actuated when the upper surface of switch 132 receives a compressing force from bracket 160 via pad 150 in response to cover 110 being pressed towards bracket 160. As illustrated in FIG. 5, pad 150 may include an upper stepped surface with an upper protrusion coupled to bracket 160 and a lower stepped surface with a lower protrusion coupled to switch 132. In other words, pad 150 is compressed between circuit board 130 and bracket 160 and surrounds the surfaces of switch 132 extending from circuit board 130 (e.g., an upper and side surfaces of switch 132). It is appreciated that in some implementations, pad 150 may be of any shape that may be coupled to bracket 160 and switch 132, for example, a dome, a pyramid, a trapezoid, etc. It an implementation, a lower stepped surface of pad 150 may be of a different shape than the upper stepped surface of pad 150.

It is appreciated that pad 150 may be composed of any flexible material (e.g., rubber, plastic, metal, ceramic, etc.) to absorb and/or dissipate a force applied thereon from bracket 160 in an unloaded position. It will be understood that the tolerance level of pad 150 to a force from bracket 160 in an unloaded position may absorb and/or dissipate a force produced as a result of a manufacturing error in bracket 160 as described above with respect to FIG. 2. In an implementation, bracket 160 may be deformed as a result of a stamping process. In such an implementation, pad 150 may deform to absorb and/or dissipate a force resulting from the deformation of bracket 160 to prevent actuation of the switch 132. It will be understood that pad 150 may absorb and/or dissipate a force applied thereon with a tolerance level of the upper protrusion of the upper stepped surface of pad 150. It will be understood that the tolerance level of pad 150 may be selected according to the rigidity of the material of bracket 160 and the likelihood of manufacturing errors in bracket 160.

It will be understood that a deformation force may be applied to pad 150 as a result of a manufacturing error in another component of click pad 100 other than bracket 160. For example, a deformation in support frame 140 from being an approximately planar support frame may result in a deformation force on switch 132. Similarly, a defect in cover bracket 120 may result in a deformation force on switch 132. It will be appreciated that use of pad 150 may reduce the incidents of pre-loading of switch 132 by absorbing and/or dissipating a deformation force. It will be further appreciated that use of pad 150 and supporting arms 144 and 146 may reduce the difference in travel distances of click pad 150 by more efficiently transferring a force applied to the cover 110 to actuate switch 132.

FIG. 6 is a flowchart of an example method 600 for dissipating a deformation force from bracket 160 in click pad 100. The descriptions of method 600 refer to elements of click pad 100 for illustration, however, it is appreciated that this method can be used for any suitable click pad described herein or otherwise. Moreover, although the flowchart of FIG. 6 shows a specific order of performance, this order may be rearranged into another suitable order, may be executed concurrently or with partial concurrence, or a combination thereof. Likewise, suitable additional and/or comparable steps may be added to method 600 to achieve same or comparable functionality.

At 602 of method 600, click pad 100 may receive a deformation force from bracket 160 in pad 150 disposed on first surface of switch 132 extending from circuit board 130. In the example of FIG. 6, circuit board 130 may be a printed circuit board and the pad 150 may surround an upper and side surfaces of switch 132.

At 604, the upper protrusion of the upper stepped surface of pad 15 coupled to bracket 160 may be compressed in response to receiving the deformation force from bracket 160. It will be understood that, the upper protrusion of pad 150 may dissipate the deformation force from bracket 160 from reaching the switch 132 when the deformation force is less than a tolerance level of the upper protrusion of pad 150.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be understood that the systems, apparatuses, and methods described herein can include various combinations and/or sub-combinations of the components and/or features of the different implementations described. Thus, features described with reference to one or more implementations can be combined with other implementations described herein.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A click pad comprising:
a circuit board and a switch formed to extend from a first surface of the circuit board;
a stationary pad to surround all surfaces of the switch extending from the circuit board, a first surface of the pad coupled to a first surface of the switch opposite the first surface of the circuit board, and to be compressed by actuation of the circuit board when a pressure is put on the click pad; and
a bracket coupled to a second surface of the stationary pad opposite to the first surface of the stationary pad to compress the stationary pad between the circuit board and the bracket.

2. The click pad of claim 1, wherein the second surface the stationary pad is a stepped surface with an upper protrusion coupled to the bracket.

3. The click pad of claim 2, wherein the upper protrusion of the stationary pad is to deform in response to a deformation of the bracket to prevent actuation of the switch by the deformation of the bracket within a tolerance level of the upper protrusion of the stationary pad.

4. The click pad of claim 1, further comprising:
a support frame disposed on the first surface of the circuit board with a first opening to expose the switch including a support arm extending from the support frame,
wherein the support arm is disposed to support the bracket in an unloaded position.

5. The click pad of claim 1, wherein the switch is disposed along a first edge of the touch panel.

6. The click pad of claim 5, wherein the switch is disposed approximately in the center of the first edge of the touch panel.

7. A computing device comprising:
a click pad, the click pad comprising:
a circuit board and a switch formed to extend from a first surface of the circuit board;
a support frame disposed on the first surface of the circuit board with a first opening to expose the switch including a support arm extending from the support frame;
a cover disposed on a second side of the circuit board opposite to the first side of the circuit board, the cover to receive a force in the direction towards the circuit board;
a stationary pad to surround an upper and side surfaces of the switch on the circuit board, a first surface of the stationary pad coupled to a first surface of the switch opposite the first surface of the circuit board, and to be compressed by actuation of the circuit board when a pressure is put on the cover; and
a bracket coupled to a second surface of the stationary pad opposite to the first surface of the stationary pad and secured to the support frame to compress the stationary pad between the circuit board and the bracket,
wherein the support arm is disposed to support the bracket in an unloaded position.

8. The computing device of claim 7, wherein the stationary pad surrounds the switch on the circuit board and is coupled to the switch by an adhesive.

9. The computing device of claim 7, wherein the second surface of the stationary pad is a stepped surface with an upper protrusion coupled to the bracket.

10. The computing device of claim 9, wherein the upper protrusion of the pad is to deform in response to a deformation of the bracket to prevent actuation of the switch by the deformation of the bracket within a tolerance level of the upper protrusion of the stationary pad.

11. The computing device of claim 7, wherein the stationary pad is at least one of a dome, pyramid, and trapezoid coupled to the circuit board and the switch.

12. The computing device of claim 7, wherein the switch is disposed along a first edge of the circuit board.

13. The computing device of claim 7, wherein the switch is disposed approximately in the center of the first edge of the circuit board.

14. The computing device of claim 7, further comprising:
a cover bracket to support the circuit board on a first surface of the cover bracket and the cover on a second surface of the cover bracket opposite the first surface of the cover bracket.

15. A method of dissipating deformation force from a bracket in a click pad, comprising:
receiving the deformation force from the bracket at a stationary pad disposed on a first surface of a switch extending from a printed circuit board, wherein the stationary pad surrounds an upper and side surfaces of the switch; and
compressing an upper protrusion from a first surface of the stationary pad coupled to the bracket in response to receiving the deformation force,
wherein the upper protrusion of the first surface of the pad is to dissipate the deformation force from reaching the switch when the deformation force is less than a tolerance level of the upper protrusion of the first surface of the pad to the deformation force.

* * * * *

UNITED STATES PATENT AND TRADEMARK OFFICE
CERTIFICATE OF CORRECTION

PATENT NO. : 9,984,838 B2
APPLICATION NO. : 15/309829
DATED : May 29, 2018
INVENTOR(S) : Chin-Hung Huang et al.

It is certified that error appears in the above-identified patent and that said Letters Patent is hereby corrected as shown below:

In the Claims

In Column 6, Line 24, Claim 2, after "surface" insert -- of --.

In Column 8, Line 6, Claim 15, after "dissipating" insert -- a --.

Signed and Sealed this
Ninth Day of October, 2018

Andrei Iancu
*Director of the United States Patent and Trademark Office*